(12) United States Patent
Miyazaki

(10) Patent No.: US 12,359,991 B2
(45) Date of Patent: Jul. 15, 2025

(54) TESTING SYSTEM

(71) Applicant: MEIDENSHA CORPORATION, Tokyo (JP)

(72) Inventor: Wataru Miyazaki, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/879,171

(22) PCT Filed: Jun. 13, 2023

(86) PCT No.: PCT/JP2023/021952
§ 371 (c)(1),
(2) Date: Dec. 26, 2024

(87) PCT Pub. No.: WO2024/004640
PCT Pub. Date: Jan. 4, 2024

(65) Prior Publication Data
US 2025/0164331 A1    May 22, 2025

(30) Foreign Application Priority Data

Jun. 27, 2022   (JP) ................................ 2022-102524

(51) Int. Cl.
G01L 3/04    (2006.01)
(52) U.S. Cl.
CPC ..................................... G01L 3/04 (2013.01)
(58) Field of Classification Search
CPC ........................................................ G01L 3/04
See application file for complete search history.

(56) References Cited

U.S. PATENT DOCUMENTS

2016/0252428 A1    9/2016  Akiyama et al.
2019/0137361 A1*   5/2019  Akiyama .............. G01M 15/04
(Continued)

FOREIGN PATENT DOCUMENTS

JP    2010019652 A    1/2010
JP    2015075361 A    4/2015
(Continued)

OTHER PUBLICATIONS

Takao Akiyama et al., "Low Inertia Emulation Control of Drivetrain Bench and its Application to Real Road Loads Simulation," IEEJ Transactions on Electronics, Information and Systems, vol. 135, No. 8, pp. 992-999, DOI: 10.1541/ieejeiss.135.992, 2015.

Primary Examiner — Mi'schita' Henson
(74) Attorney, Agent, or Firm — MUNCY, GEISSLER, OLDS & LOWE, P.C.

(57) ABSTRACT

An electric inertia control device of this testing system generates a torque current command signal in such a way that a dynamometer behaves as an inertial body having a prescribed set inertia Jset. The electric inertia control device includes: a target speed setting unit for generating a target speed signal on the basis of a shaft torque detection signal and the set inertia; a speed controller for generating a feedback input signal on the basis of a difference signal between the target speed signal and a speed detection signal; and a feed-forward controller for generating a feed-forward input signal on the basis of the shaft torque detection signal. The feed-forward controller generates the feed-forward input signal by combining the shaft torque detection signal, multiplied by a first feed-forward gain Kff, and an integrated value of the shaft torque detection signal, multiplied by a second feed-forward gain Kfi.

4 Claims, 6 Drawing Sheets

(56) References Cited

U.S. PATENT DOCUMENTS

2020/0326665 A1\* 10/2020 Fujiwara .................. H02K 5/24
2022/0065750 A1    3/2022 Akiyama

FOREIGN PATENT DOCUMENTS

| JP | 5733477 B2 | 6/2015 |
| JP | 2020139854 A | 9/2020 |

\* cited by examiner

TESTING SYSTEM

TECHNICAL FIELD

The present invention relates to a testing system. In more detail, the present invention relates to a testing system that includes an electric inertia control device which performs electric inertia control on a dynamometer coupled to a workpiece.

BACKGROUND ART

Drivetrain refers to a generic term of a plurality of devices for transmitting the energy generated by an engine to a drive wheel, and is configured by an engine, a clutch, a transmission, a driveshaft, a propeller shaft, differential gears, drive wheel(s), etc. In the testing system of drivetrains, the durability performance, quality, etc. of the drivetrain are evaluated, while applying the appropriate load torque to the output shaft by actually driving the transmission by an engine, and electric inertia controlling a dynamometer connected to the output shaft thereof (for example, refer to Patent Document 1).

FIG. 6 is a drawing showing the circuit configuration of a conventional electric inertia control device 100 shown in the testing system of Patent Document 1. The conventional electric inertia control device 100 includes: a target speed setting unit 101 which generates a target speed signal by integrating a value obtained by multiplying the reciprocal of a set inertia Jset by a shaft torque detection signal; a feedback controller 102 which generates a feedback input signal so that the deviation between the target speed signal and the speed detection signal is eliminated; a feed-forward controller 103 which generates a feed-forward input signal by multiplying a feed-forward gain Jdy1 by the shaft torque detection signal; and a torque electric-current command generation unit 104 which generates a torque electric current command signal for the dynamometer by combining the feedback input signal and the feed-forward input signal.

CITATION LIST

Patent Document

Patent Document 1: Japanese Patent No. 5733477

DISCLOSURE OF THE INVENTION

Problems to be Solved by the Invention

However, with the conventional electric inertia control device 100, if excluding the control gain (Ki, Kp) of the feedback controller 102, due to only including a control gain which can freely adjust the control gain (Jdy1) of the feed-forward controller 103, the degrees of freedom of adjustment is low. For this reason, as described later by referencing FIG. 6, there are cases where it is not possible to make the actual angular acceleration follow the target angular acceleration, and overshoot occurs in the speed deviation. Therefore, with a testing system made using the conventional electric inertia control device 100, it is not possible to sufficiently reproduce a low inertia state.

The present invention has an object of providing a testing system which can reproduce a low inertia state.

Means for Solving the Problems (1) A testing system (for example, the testing system 1 described later) according to the present invention includes: a dynamometer (for example, the dynamometers 21, 22 described later) coupled to an output shaft (for example, the output shafts S1, S2 described later) of a workpiece (for example, the transmission T and the engine E described later); an inverter (for example, the inverters 31, 32 described later) which supplies electric power according to a torque electric current command signal to the dynamometer; a shaft torque detector (for example, the shaft torque detectors 51, 52 described later) which outputs a shaft torque detection signal according to a shaft torque acting on the output shaft; a speed detector (for example, the speed detectors 41, 42 described later) which outputs a speed detection signal according to a revolution speed of the dynamometer; and an electric inertia control device (for example, the electric inertia control devices 6, 7 described later) which generates the torque electric current command signal based on the shaft torque detection signal and the speed detection signal, so that the dynamometer behaves as an inertial body having a predetermined set inertia (for example, the set inertia Jset described later), in which the electric inertia control device includes: a target speed setting unit (for example, the target speed setting unit 60 described later) which generates a target speed signal based on the shaft torque detection signal and the set inertia; a speed controller (For example, the speed controller 63 described later) which generates a feedback input signal based on a deviation signal between the target speed signal and the speed detection signal; a feed-forward controller (for example, the feed-forward controller 65 described later) which generates a feed-forward input signal based on the shaft torque detection signal; and a torque electric current command signal generation unit (for example, the torque electric current command signal generation unit 67 described later) which generates the torque electric current command signal based on the feedback input signal and the feed-forward input signal, and in which the feed-forward controller generates the feed-forward input signal by combining a value obtained by multiplying a first feed-forward gain (for example, the first feed-forward gain Kff described later) by the shaft torque detection signal, and a value obtained by multiplying a second feed-forward gain (for example, the second feed-forward gain Kfi described later) by an integrated value of the shaft torque detection signal.

(2) In this case, the target speed setting unit preferably includes a phase adjuster (for example, the phase adjuster 601 described later) which conducts phase adjustment processing on the shaft torque detection signal.

(3) In this case, a transfer function G(s) of the phase adjuster is represented by Formula (1) below, using two phase adjustment constants (Q, P).

[Math. 1]

$$G(s) = \frac{Q \cdot s + 1}{P \cdot s + 1} \quad (1)$$

(4) In this case, it is preferable for a transfer function from the shaft torque detection signal until the speed detection signal of the electric inertia control device approximates a control target including the dynamometer and the inverter by a single inertia system having an inertia moment Jdy, and when establishing the speed controller as a PI controller characterized by a proportional gain Kp and an integral gain Ki, the transfer function is expressed by Formula (2) below. In Formula (2) below, "W" is the speed detection signal, "Td" is the shaft torque detection signal, "Jset" is the set inertia, "Kff" is the first feed-forward gain, and "Kfi" is the second feed-forward gain.

$$\frac{W}{Td} = \frac{1}{Jset} \times \frac{\begin{array}{c}JsetP(Kff+1)\cdot s^3 + \\ (KpQ + Jset\ KfiP + Jset\ Kff + Jset)\cdot s^2 + \\ (Ki\ Q + Kp + Jset\ Kfi)\cdot s + Ki\end{array}}{(P\cdot s+1)(Jdy\cdot s^2 + Kp\cdot s + Ki)} \quad \text{[Math. 2]}$$

Effects of the Invention (1) The electric inertia control device of the testing system related to the present invention includes: the target speed setting unit which generates the target speed signal based on the shaft torque detection signal and the set inertia; the speed controller which generates the feedback input signal based on the deviation signal between the target speed signal and the speed detection signal; the feed-forward controller which generates the feed-forward input signal based on the shaft torque detection signal; and the torque electric current command signal generation unit which generates the torque electric current command signal based on the feedback input signal and the feed-forward input signal, and inputs this signal to the inverter of the dynamometer. Herein, in the present invention, the feed-forward controller generates the feed-forward input signal by combining a value obtained by multiplying the first feed-forward gain by the shaft torque detection signal, and a value obtained by multiplying the second feed-forward gain by the integrated value of the shaft torque detection signal. Consequently, according to the present invention, since it is possible to determine the characteristics of the electric inertia control device so that overshoot is suppressed, via adjustment of the first feed-forward gain and the second feed-forward gain, a low inertia state can also be reproduced.

(2) The target speed setting unit includes the phase adjuster which conducts phase adjustment processing on the shaft torque detection signal. Consequently, according to the present invention, since it is also possible to adjust the phase adjustment processing by the phase adjuster, in addition to the first and second feed-forward gains of the feed-forward controller, the degrees of freedom in control by the electric inertia control devices can be further raised.

(3) The testing system according to the present invention generates the target speed signal using the phase adjuster expressed by the transfer function shown in the above Formula (1). Consequently, according to the present invention, since the characteristics of the electric inertia control device can be determined so that overshoot is suppressed, via the adjustment of the first and second feed-forward gains of the feed-forward controller, and the two phase adjustment constants (Q, P) of the phase adjuster, it is also possible to more accurately reproduce a low inertia state.

(4) According to the testing system related to the present invention, since it is possible to adjust the characteristic of the numerator of the transfer function (W/Td) by the three control gains (Q, Kff, Kfi), the frequency characteristic is easily changed, whereby overshoot can be suppressed.

PREFERRED MODE FOR CARRYING OUT THE INVENTION

Hereinafter, a testing system 1 including an electric inertia control device according to an embodiment of the present invention will be described while referencing the drawings.

Figure 1:
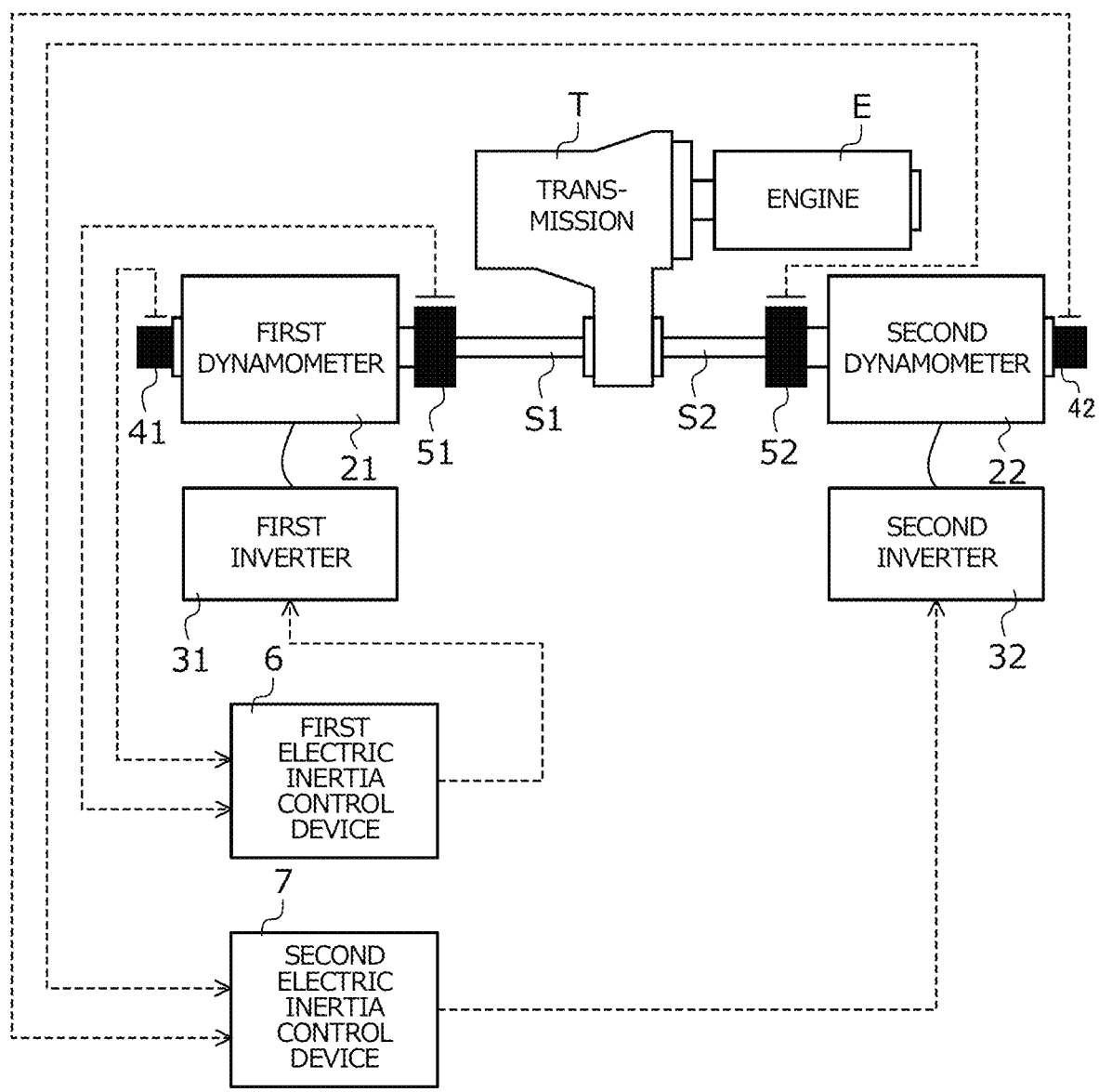
FIG. 1 is a drawing showing the configuration of a testing system according to an embodiment of the present invention.

FIG. 1 is a drawing schematically showing the configuration of the testing system 1 according to the present embodiment. It should be noted that, in the present embodiment, the testing system 1 which establishes a workpiece configured by a transmission T and an engine E as a test piece (so-called drivetrain bench system) will be described as an example; however, the present invention is not to be limited thereto. The present invention can also be applied to testing systems such as an engine bench system which establishes the engine as the test piece, and a chassis dynamometer system which establishes the chassis as the test piece. In addition, FIG. 1 shows an example of the testing system 1 establishing the transmission T of an FF drive-type vehicle and the engine E connected to the input shaft thereof as the test piece; however, the present invention is not limited thereto. The test piece may be the transmission and engine of an FR drive-type vehicle. In addition, the power source connected to the input shaft of the transmission T may be established as a dynamometer in place of an actual engine E.

The testing system 1 includes: a first dynamometer 21 and a second dynamometer 22 connected to output shafts S1, S2 of the transmission T; a first inverter 31 and a second inverter 32 which supply electric power to these dynamometers 21, 22; a first speed detector 41 and a second speed detector 42 which detect the revolution speeds of these dynamometers 21, 22; a first shaft torque detector 51 and a second shaft torque detector 52 which detect the shaft torques of the output shafts S1, S2; a first electric inertia control device 6 which controls the first dynamometer 21 based on the detection signals of the first speed detector 41 and the first shaft torque detector 51; a second electric inertia control device 7 which controls the second dynamometer 22 based on the detection signals of the second speed detector 42 and the second shaft torque detector 52; and an engine control device (not shown) which controls the engine E. With this testing system, the durability performance, quality, etc. of the transmission T are evaluated while applying the appropriate load torque to the output shafts S1, S2 by driving the transmission T, by the engine E, and subjecting the dynamometers 21, 22 coupled to these output shafts S1, S2 to electric inertia control by the electric inertia control devices 6, 7.

The first inverter 31 supplies electric power according to the torque electric current command signal outputted from the first electric inertia control device 6 to the first dynamometer 21. The second inverter 32 supplies electric power according to the torque electric current command signal outputted from the second electric inertia control device 7 to the second dynamometer 22.

The first speed detector 41 sends a speed detection signal according to the revolution speed of the first dynamometer 21 to the first electric inertia control device 6. The second speed detector 42 sends a speed detection signal according to the revolution speed of the second dynamometer 22 to the second electric inertia control device 7.

The first shaft torque detector 51 detects the shaft torque acting on the output shaft S1 coupled to the first dynamometer 21 from the strain amount in the twisting direction of the shaft, for example, and sends a shaft torque detection signal according to the detection value to the first electric inertia control device 6. The second shaft torque detector 52 detects the shaft torque acting on the output shaft S2 coupled to the second dynamometer 22 from the strain amount in the twisting direction of the shaft, for example, and sends a shaft torque detection signal according to the detection value to the second electric inertia control device 7.

The first electric inertia control device 6 generates a torque electric current command signal for the first dynamometer 21 based on the shaft torque detection signal outputted from the first shaft torque detector 51 and the speed detection signal outputted from the first speed detector 41, so that the first dynamometer 21 behaves as an inertial body having a predetermined set inertia, and inputs this signal to the first inverter 31. The second electric inertia control device 7 generates a torque electric current command signal for the second dynamometer 22 based on the shaft torque detection signal outputted from the second shaft torque detector 52 and the speed detection signal outputted from the second speed detector 42, so that the second dynamometer 22 behaves as an inertial body having a predetermined set inertia, and inputs this signal to the second inverter 32.

Figure 2:
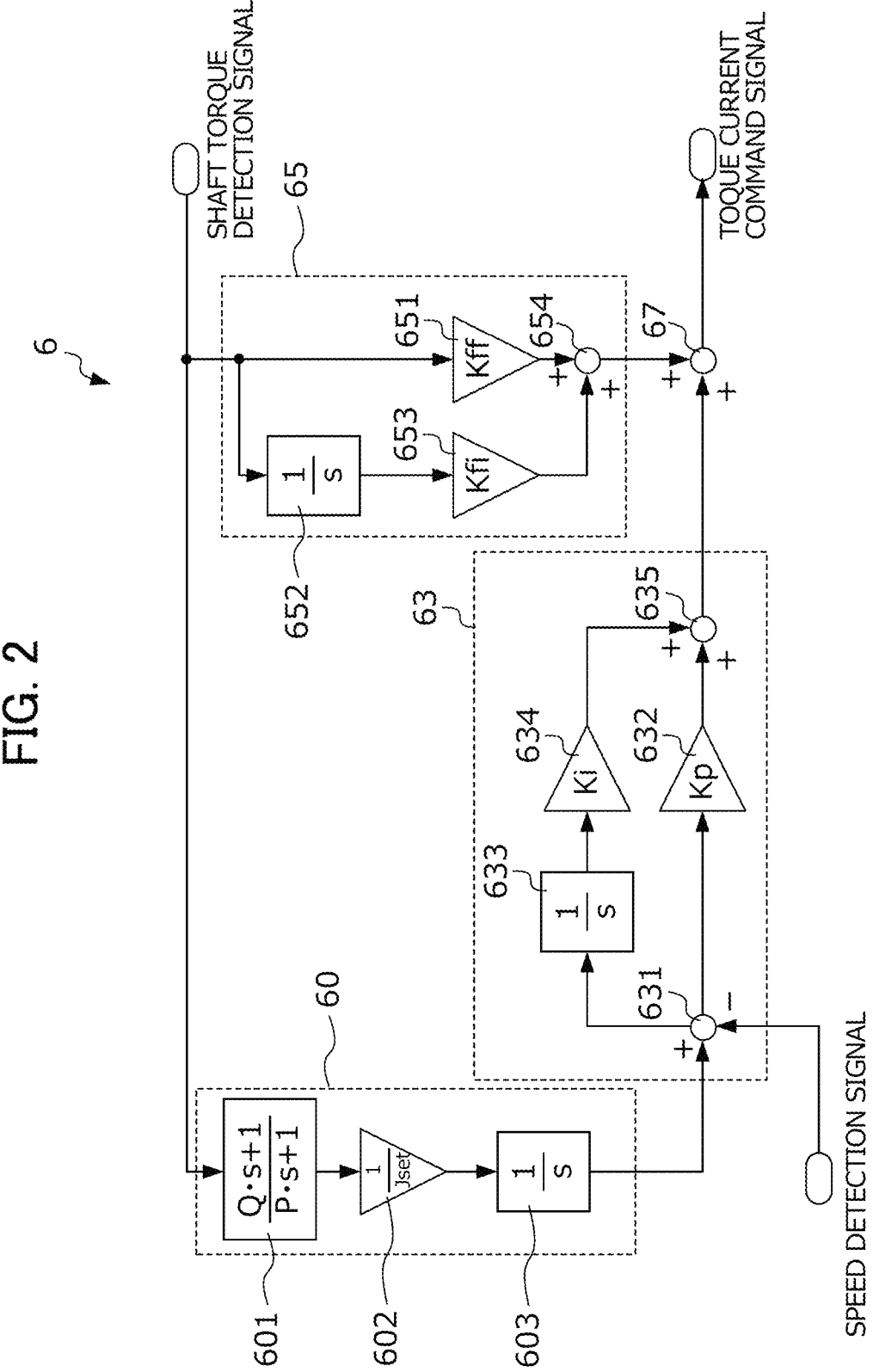
FIG. 2 is a drawing showing the circuit configuration of a first electric inertia control device.

FIG. 2 is a drawing showing the circuit configuration of the first electric inertia control device 6. It should be noted that the circuit configuration and effects exerted by the second electric inertia control device 7 are substantially the same as the first electric inertia control device 6; therefore, drawings and detailed descriptions thereof will be omitted.

The first electric inertia control device 6 includes: a target speed setting unit 60 which generates a target speed signal corresponding to the target for the speed detection signal based on the shaft torque detection signal and a predetermined set inertia Jset; a speed controller 63 which generates a feedback input signal based on a deviation signal between the target speed signal outputted from the target speed setting unit 60 and the speed detection signal; a feed-forward controller 65 which generates a feed-forward input signal based on the shaft torque detection signal; and a torque electric current command signal generation unit 67 which generates a first torque electric current command signal for the first dynamometer 21 based on the feedback input signal outputted from the speed controller 63 and the feed-forward input signal outputted from the feed-forward controller 65, and inputs this signal to the first inverter 31.

The target speed setting unit 60 includes: a phase adjuster 601 which conducts phase adjustment processing on the shaft torque detection signal; a multiplier 602 which multiplies the reciprocal of the setting inertia Jset by the shaft torque detection signal subjected to the phase adjustment processing; and an integrator 603 which generates the target speed signal for the speed detection signal by integrating the output signals of the multiplier 602. The target speed setting unit 60 generates a target speed signal for making the behavior of the first dynamometer 21 match with the behavior of an inertial body having the set inertia Jset, using this phase adjuster 601, multiplier 602 and integrator 603.

A transfer function G(s) of the phase adjuster 601 is expressed by the following Formula (3), using two phase adjustment constants (Q, P). It should be noted that "s" represents a Laplace operator in the following Formula.

[Math. 3]

$$G(s) = \frac{Q \cdot s + 1}{P \cdot s + 1} \quad (3)$$

The speed controller 63 includes: a deviation signal generation unit 631 which generates a deviation signal by subtracting the speed detection signal from the target speed signal; a first multiplier 632 which multiplies a proportional gain Kp by the deviation signal; an integrator 633 which integrates the deviation signal; a second multiplier 634 which multiplies an integral gain Ki by a signal outputted from the integrator 633; and an adder 635 which generates a feedback input signal by combining the output signal of the first multiplier 632 and the output signal of the second multiplier 634. It should be noted that, in the present embodiment, a case is described in which the speed controller 63 generates a feedback input signal such that the deviation signal between the target speed signal and the speed detection signal is eliminated in accordance with PI control law; however, the present invention is not to be limited thereto. The speed controller 63 may generate a feedback input signal in accordance with a known feedback control law in addition to PI control law.

The feed-forward controller 65 includes: a first multiplier 651 which multiplies the first feed-forward gain Kff by the shaft torque detection signal; an integrator 652 which integrates the shaft torque detection signal; a second multiplier 653 which multiplies the second feed-forward gain Kfi by a signal outputted from the integrator 652; and an adder 654 which generates a feed-forward input signal by combining the output signal of the first multiplier 651 and the output signal of the second multiplier 653.

The torque electric current command signal generation unit 67 generates a torque electric current command signal, by combining a feedback input signal outputted from the speed controller 63, and a feedback input signal outputted from the feed-forward controller 65.

Figure 6:
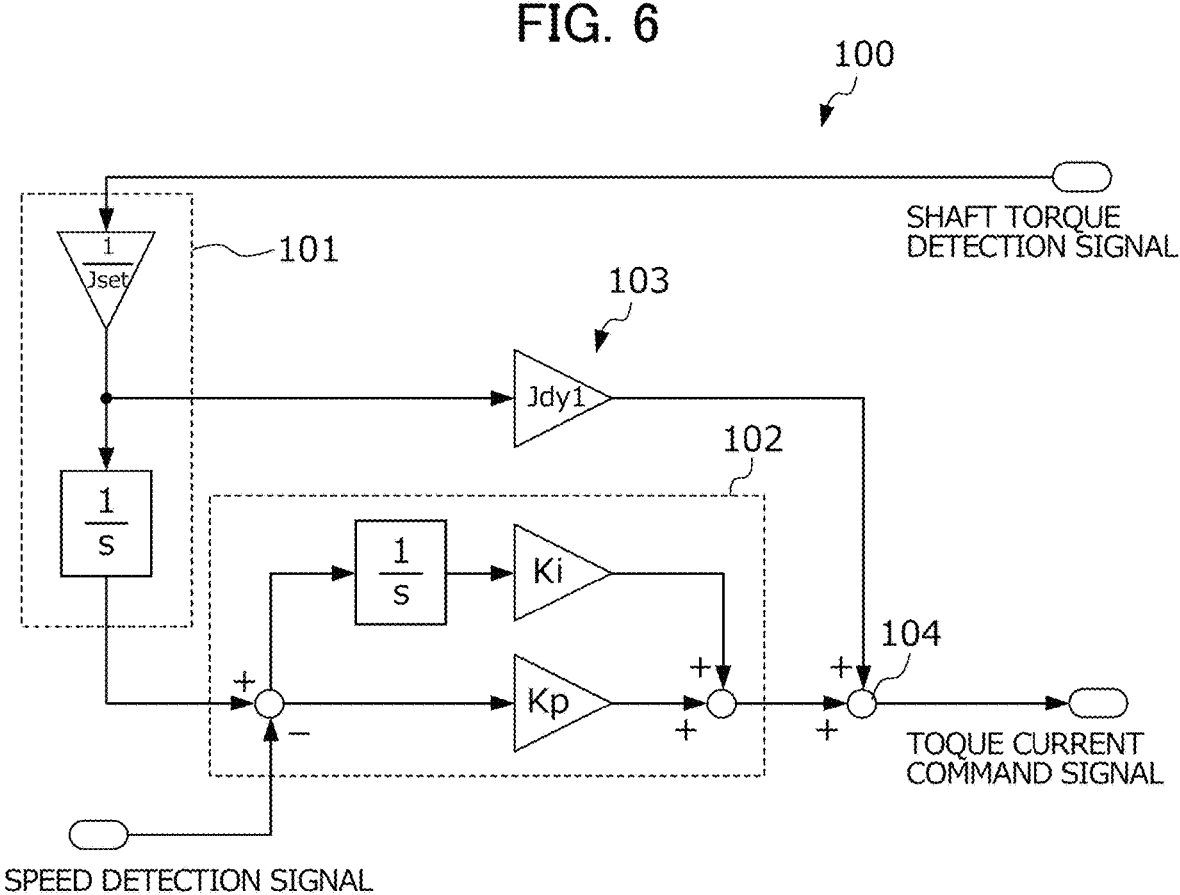
FIG. 6 is a drawing showing the circuit configuration of the conventional electric inertia control device.

Next, the first electric inertia control device 6 according to the above such present embodiment, and the conventional electric inertia control device 100 shown in FIG. 6 will be compared.

First, the first electric inertia control device 6 differs from the conventional electric inertia control device 100 in the point of the target speed setting unit 60 including the phase adjuster 601, and the feed-forward controller 65 including the integrator 652 and the second multiplier 653.

The following Formula (4) shows a transfer function from the shaft torque detection signal (Td) until the angular acceleration (W) of the first electric inertia control device 6.

$$\frac{W}{Td} = \frac{1}{Jset} \times \frac{\begin{array}{l}JsetP(Kff+1) \cdot s^3 + \\ (KpQ + Jset\ KfiP + Jset\ Kff + Jset) \cdot s^2 + \\ (Ki\ Q + Kp + Jset\ Kfi) \cdot s + Ki\end{array}}{(P \cdot s + 1)(Jdy \cdot s^2 + Kp \cdot s + Ki)} \quad \text{[Math. 4]}$$

In addition, the following Formula (5) shows a transfer function from the shaft torque detection signal (Td) until the angular acceleration (W) of the conventional electric inertia control device 100.

[Math. 5]

$$\frac{W}{Td} = \frac{1}{Jset} \times \frac{(Jset + Jdy1) \cdot s^2 + Kp \cdot s + Ki}{Jdy \cdot s^2 + Kp \cdot s + Ki} \quad (5)$$

It should be noted that, upon deriving the above Formulas (4) and (5), the control target was regarded as a single inertia system having an inertia moment "Jdy". As shown in the above Formula (5), the conventional electric inertia control device 100 can only adjust the characteristic of the numerator of the transfer function (W/Td) by the control gain Jdy1. In contrast, the first electric inertia control device 6 according to the present embodiment can adjust the characteristic of the numerator of the transfer function (W/Td) by the three control gains (Q, Kff, Kfi). For this reason, the first electric inertia control device 6 has a higher degree of freedom of adjustment than the conventional electric inertia control device 100. In this way, according to the first electric inertia control device 6, by being able to freely adjust the characteristic of the numerator of the transfer function (W/Td) by the three control gains (Q, Kff, Kfi), the frequency characteristic is easily changed, whereby overshoot can be suppressed.

Figure 3:
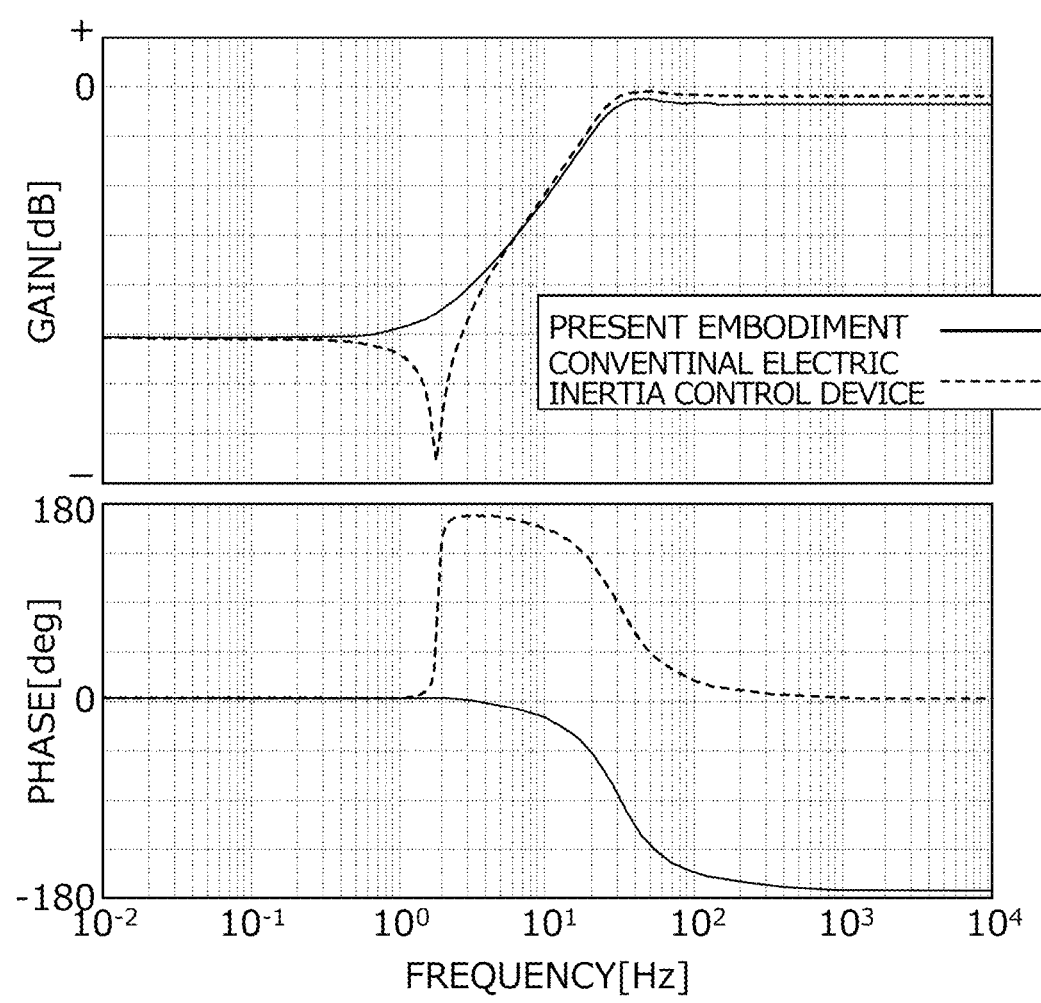
FIG. 3 provides graphs comparing the frequency characteristics between a conventional electric inertia control device and an electric inertia control device according to the present embodiment.
Figure 4:
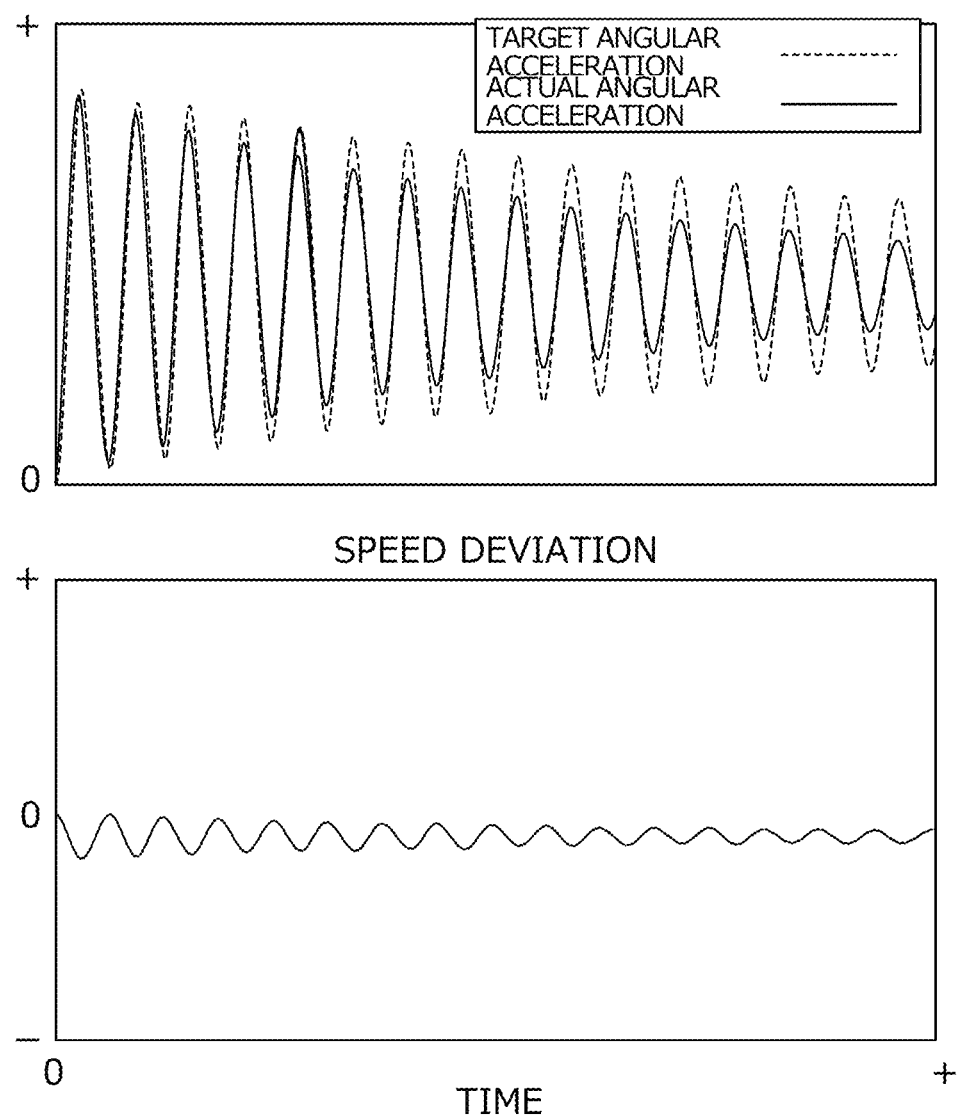
FIG. 4 provides graphs showing examples of the waveforms realized by the electric inertia control device according to the present embodiment.
Figure 5:
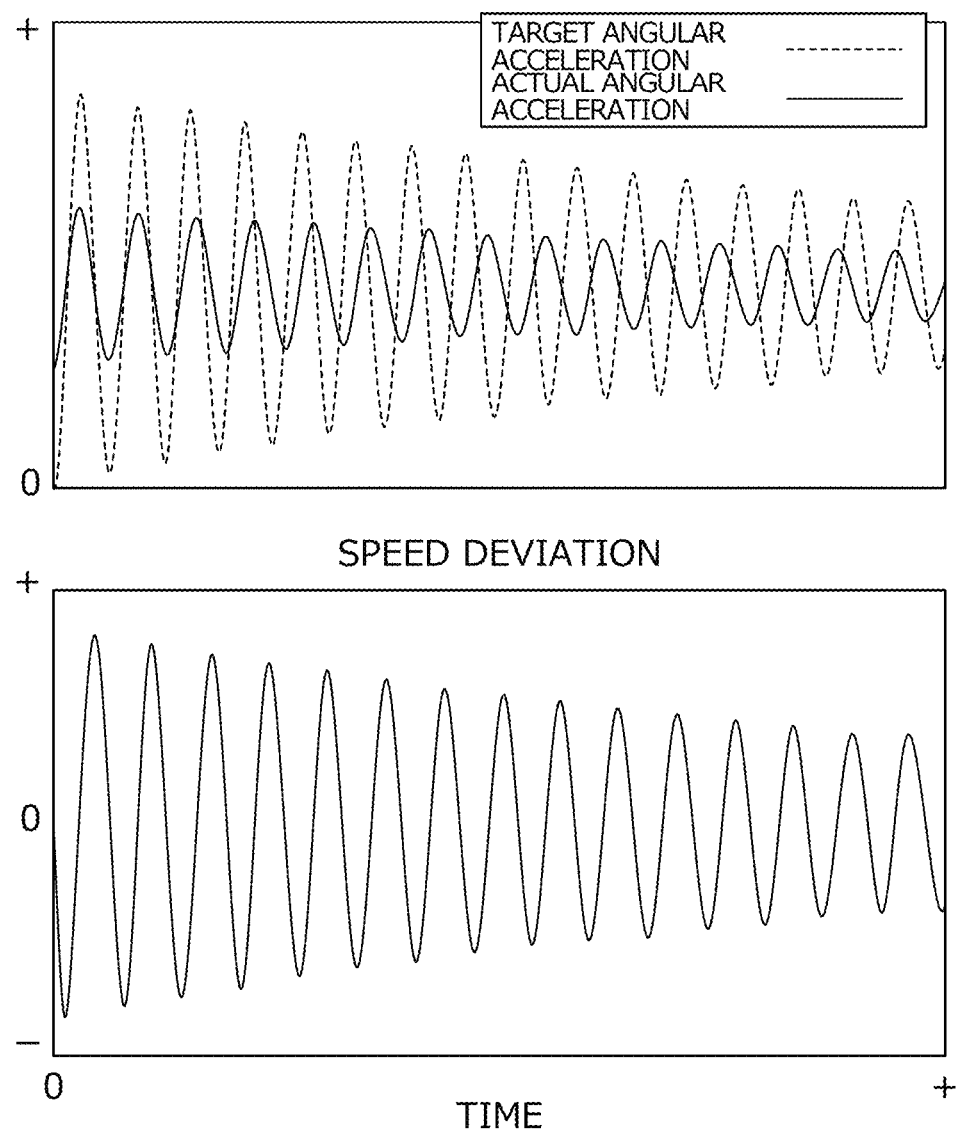
FIG. 5 provides graphs showing an examples of the waveforms realized by the conventional electric inertia control device.

FIG. 3 provides graphs comparing the frequency characteristics between the conventional electric inertia control device 100, and the first electric inertia control device 6 according to the present embodiment. FIG. 4 provides graphs showing examples of the waveforms (angular acceleration, and speed deviation) realized by the first electric inertia control device 6. FIG. 5 provides graphs showing an examples of the waveforms (angular acceleration, and speed deviation) realized by the conventional electric inertia control device 100. It should be noted that, in FIGS. 4 and 5, the value obtained by overlapping the target angular acceleration derived from the target speed and the actual angular acceleration is plotted at the top, and the speed deviation is plotted at the bottom.

As shown in FIG. 3, in the conventional electric inertia control device 100, a band exists in which the gain declines in the range of about 1 to 10 (Hz). Therefore, in this band, the response worsens, and it is not possible to reproduce a low inertia state. In addition, for this reason, with the conventional electric inertia control device 100, it is not possible to make the actual angular acceleration follow the target angular acceleration, and thus the speed deviation also becomes large, as shown in FIG. 5.

In contrast, with the first electric inertia control device 6 according to the present embodiment, it is possible to make the responsiveness favorable as shown in FIG. 3, via adjustment of the three control gains (Q, Kff, Kfi) as described above. For this reason, with the first electric inertia control device 6 according to the present embodiment, it is also possible to reproduce the low inertia state. For this reason, as shown in FIG. 4, with the first electric inertia control device 6 according to the present embodiment, it is possible to make the actual angular acceleration follow the target angular acceleration.

According to the testing system 1 related to the present embodiment, the following effects are exerted.

(1) The electric inertia control devices 6, 7 of the testing system 1 each include: the target speed setting unit 60 which generates the target speed signal based on the shaft torque detection signal and the set inertia Jset; the speed controller 63 which generates the feedback input signal based on the deviation signal between the target speed signal and the speed detection signal; the feed-forward controller 65 which generates the feed-forward input signal based on the shaft torque detection signal; and the torque electric current command signal generation unit 67 which generates the torque electric current command signal based on the feedback input signal and the feed-forward input signal, and inputs this signal to the inverters 31, 32 of the dynamometers 21, 22. Herein, with the present embodiment, the feed-forward controller 65 generates the feed-forward input signal by combining a value obtained by multiplying the first feed-forward gain Kff by the shaft torque detection signal, and a value obtained by multiplying the second feed-forward gain Kfi by the integrated value of the shaft torque detection signal. Consequently, according to the electric inertia control devices 6, 7, since it is possible to determine the characteristics of the electric inertia control devices 6, 7 so that overshoot is suppressed, via adjustment of the first feed-forward gain Kff and the second feed-forward gain Kfi, a low inertia state can also be reproduced.

(2) The target speed setting unit 60 includes the phase adjuster 601 which conducts phase adjustment processing on the shaft torque detection signal. Consequently, according to the electric inertia control devices 6, 7, since it is also possible to adjust the phase adjustment processing by the phase adjuster 601, in addition to the first and second feed-forward gains (Kff, Kfi) of the feed-forward controller 65, the degrees of freedom in control by the electric inertia control devices 6, 7 can be further raised.

(3) The testing system 1 generates the target speed signal using the phase adjuster 601 expressed by the transfer function G(s) shown in the above Formula (2). Consequently, according to the electric inertia control devices 6, 7, since the characteristics of the electric inertia control devices 6, 7 can be determined so that overshoot is suppressed, via the adjustment of the first and second feed-forward gains (Kff, Kfi) of the feed-forward controller 65, and the two phase adjustment constants (Q, P) of the phase adjuster 601, it is also possible to more accurately reproduce a low inertia state.

(4) According to the testing system 1, since it is possible to adjust the characteristic of the numerator of the transfer function (W/Td) by the three control gains (Q, Kff, Kfi), the frequency characteristic is easily changed, whereby overshoot can be suppressed.

Although an embodiment of the present invention has been described above, the present invention is not to be limited thereto. The configurations of detailed parts may be modified as appropriate within the scope of the gist of the present invention.

EXPLANATION OF REFERENCE NUMERALS 1 testing system
T transmission (workpiece)
S1, S2 output shaft
E engine (workpiece)
21 first dynamometer (dynamometer)
22 second dynamometer (dynamometer)
31 first inverter (inverter)
32 second inverter (inverter)
41 first speed detector (speed detector)
42 second speed detector (speed detector)
51 first shaft torque detector (shaft torque detector)
52 second shaft torque detector (shaft torque detector)
6 first electric inertia control device (electric inertia control device)
7 second electric inertia control device (electric inertia control device)

The invention claimed is:

1. A testing system comprising:
a dynamometer coupled to an output shaft of a workpiece;
an inverter that supplies electric power according to a torque electric current command signal to the dynamometer;
a shaft torque detector that outputs a shaft torque detection signal according to a shaft torque acting on the output shaft;
a speed detector that outputs a speed detection signal according to a revolution speed of the dynamometer; and
an electric inertia control device that generates the torque electric current command signal based on the shaft torque detection signal and the speed detection signal, so that the dynamometer behaves as an inertial body having a predetermined set inertia,
wherein the electric inertia control device includes:
a target speed setting unit that generates a target speed signal based on the shaft torque detection signal and the set inertia;
a speed controller that generates a feedback input signal based on a deviation signal between the target speed signal and the speed detection signal;
a feed-forward controller that generates a feed-forward input signal based on the shaft torque detection signal; and
a torque electric current command signal generation unit that generates the torque electric current command signal based on the feedback input signal and the feed-forward input signal, and
wherein the feed-forward controller generates the feed-forward input signal by combining a value obtained by multiplying a first feed-forward gain by the shaft torque detection signal, and a value obtained by multiplying a second feed-forward gain by an integrated value of the shaft torque detection signal.

2. The testing system according to claim 1, wherein the target speed setting unit includes a phase adjuster that conducts phase adjustment processing on the shaft torque detection signal.

3. The testing system according to claim 2, wherein a transfer function G(s) of the phase adjuster is expressed by Formula (1) below, using two phase adjustment constants (Q, P)

[Math. 1]
$$G(s) = \frac{Q \cdot s + 1}{P \cdot s + 1}. \tag{1}$$

4. The testing system according to claim 3, wherein a transfer function from the shaft torque detection signal until the speed detection signal of the electric inertia control device approximates a control target including the dynamometer and the inverter by a single inertia system having an inertia moment Jdy, and when establishing the speed controller as a PI controller characterized by a proportional gain Kp and an integral gain Ki, the transfer function is expressed by Formula (2) below,
wherein, in Formula (2) below, "W" is the speed detection signal, "Td" is the shaft torque detection signal, "Jset" is the set inertia, "Kff" is the first feed-forward gain, and "Kfi" is the second feed-forward gain

[Math. 2]
$$\frac{W}{Td} = \frac{1}{Jset} \times \frac{\begin{array}{l} JsetP(Kff+1)\cdot s^3 + \\ (KpQ + Jset\,KfiP + Jset\,Kff + Jset)\cdot s^2 + \\ (Ki\,Q + Kp + Jset\,Kfi)\cdot s + Ki \end{array}}{(P\cdot s + 1)(Jdy\cdot s^2 + Kp\cdot s + Ki)}. \tag{2}$$

* * * * *